United States Patent
Wolf et al.

(10) Patent No.: US 6,366,941 B1
(45) Date of Patent: *Apr. 2, 2002

(54) MULTI-DIMENSIONAL GALOIS FIELD MULTIPLIER

(75) Inventors: Tod D. Wolf, Richardson; Patrick W. Bosshart, Plano; David R. Shoemaker, Dallas, all of TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,000

(22) Filed: Mar. 20, 1998

Related U.S. Application Data

(60) Provisional application No. 60/073,486, filed on Feb. 3, 1998.

(51) Int. Cl.[7] .................................................. G06F 7/00
(52) U.S. Cl. ....................................................... 708/492
(58) Field of Search ................................... 708/491, 492

(56) References Cited

U.S. PATENT DOCUMENTS

| | | | |
|---|---|---|---|
| 4,847,801 A | * | 7/1989 | Tong .......................... 708/492 |
| 5,046,037 A | * | 9/1991 | Cognault et al. ............ 708/492 |
| 5,502,665 A | * | 3/1996 | Im ............................... 708/492 |
| 5,768,168 A | * | 6/1998 | Im ............................... 708/492 |

* cited by examiner

*Primary Examiner*—Chuong Dinh Ngo
(74) *Attorney, Agent, or Firm*—Wade James Brady, III; Frederick J. Telecky, Jr.

(57) ABSTRACT

An implementation of a multi-dimensional galois field multiplier and a method of galois field multi-dimensional multiplication which are able to support many communication standards having various symbol sizes(16), different GFs (14), and different primitive polynomials(12), in a cost-efficient manner is disclosed. The key to allow a single implementation to perform for all different GF sizes is to shift the one of the two operands(16) and primitive polynomial(12) to the left and to shift the intermediate output ZO(28) to the right in dependence upon the relative size of the GF(14) as compared to the size of the operand, primitive polynomial or intermediate output, whichever is being shifted. The shifting of the above-mentioned signals allows the MULT-XOR arrays(26) to operate on all fields with the exact same hardware with a minimum delay of 2 gates per block or with a critical delay of 2 XOR gates.

11 Claims, 2 Drawing Sheets

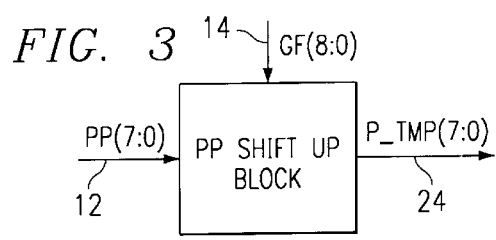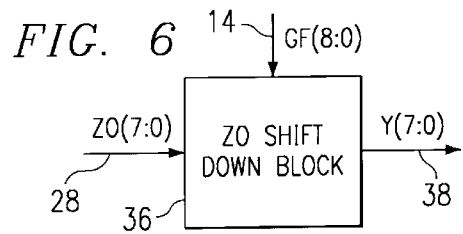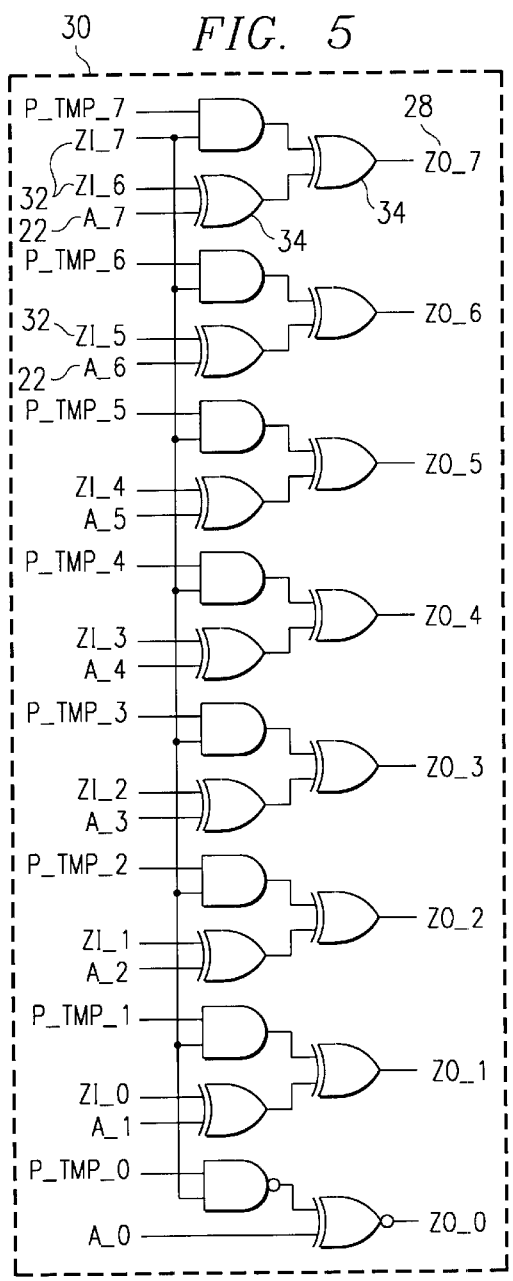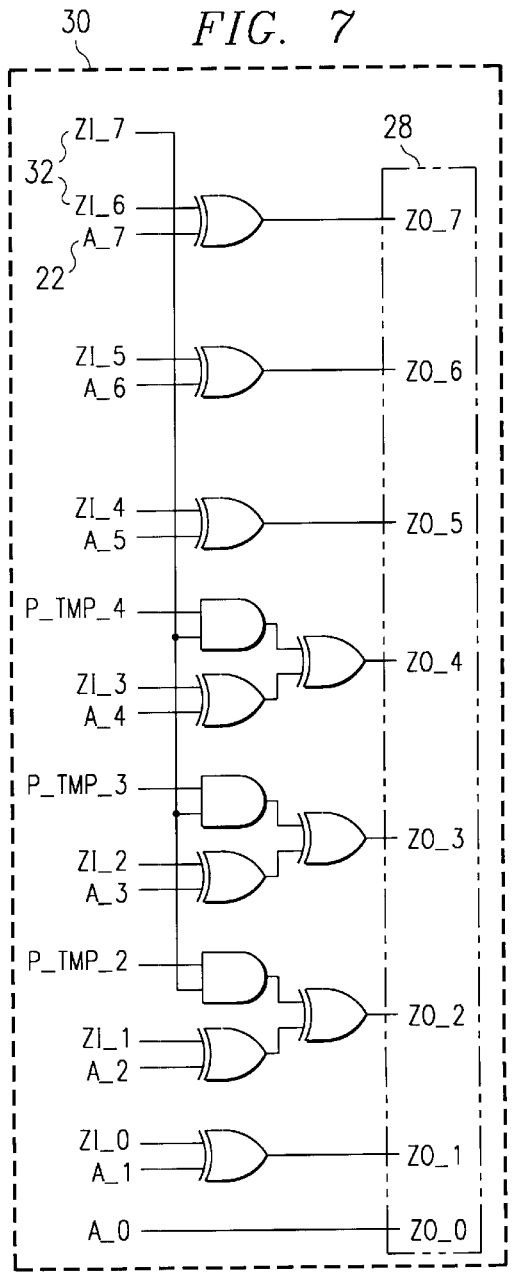

MULTI-DIMENSIONAL GALOIS FIELD MULTIPLIER

This application claims priority under 35 USC § 119 (e) (1) of provisional application No. 60/073,486, filed Feb. 3, 1998.

FIELD OF THE INVENTION

This invention relates in general to galois field arithmetic and more specifically to a single implementation of a multi-dimensional galois field multiplier.

BACKGROUND OF THE INVENTION

Galois Field arithmetic is a cyclic finite field arithmetic such that any operation performed on any two numbers within the filed, yields a number in the field, i.e. there is no operation which can be done on any two numbers within the field which yields a number outside of the field. Finite field arithmetic uses real numbers that consist of the range of numbers shown in Table 1 below. For example, the range of integers from 0 to 7(0,1,2,3,4,5,6,7) has a Galois Field representation or notation of GF(8) because the Galois Field has 8 elements, while the range of integers 0 to 1 has a Galois Field of GF(2) because it has only two elements, etc. In addition, digital systems transmit data in bits. Because bits are binary, they can only take on one of two values, either a 0 or a 1. Grouping these bits together to build a symbol is common in digital systems. These groupings are all based on a power of two. Table 1 lists the digital symbols vs. GF notation.

TABLE 1

Digital symbols vs. GF notation

| Number of bits per symbol | Range of integers | GF notation |
| --- | --- | --- |
| 1 | 0 to 1 | GF(2) |
| 2 | 0 to 3 | GF(4) |
| 3 | 0 to 7 | GF(8) |
| 4 | 0 to 15 | GF(16) |
| 5 | 0 to 31 | GF(32) |
| 6 | 0 to 63 | GF(64) |
| 7 | 0 to 127 | GF(128) |
| 8 | 0 to 255 | GF(256) |

There are several ways of representing the numbers in the finite field of any given Galois Field. For example, the data shown on Table 2 shows the integer, binary and polynomial representations of the numbers of GF(8).

TABLE 2

Representations of Galois Field (GF)(8)

| Integer | Binary | Polynomial |
| --- | --- | --- |
| 0 | 000 | 0 |
| 1 | 001 | 1 |
| 2 | 010 | $x$ |
| 3 | 011 | $x + 1$ |
| 4 | 100 | $x^2$ |
| 5 | 101 | $x^2 + 1$ |
| 6 | 110 | $x^2 + x$ |
| 7 | 111 | $x^2 + x + 1$ |

In addition, each Galois Field has one or more primitive polynomials which is analogous to a particular set of consecutive real integers which also has one or more prime numbers, depending upon how large is the particular set of consecutive integers. Primitive polynomials, p(x), are polynomials which are used to define the arithmetic functions for each field. For example, in Galois Field arithmetic, like arithmetic, certain mathematical properties exist such as laws of commutativity, associativity, etc. Therefore, when determining what is the sum or product of any two elements within a Galois Field, if after applying such laws, the sum or product will lie outside the Galois Field, that sum or product is divided by a predetermined primitive polynomial. In this way, the Galois Field is preserved. Table 3 lists the integer representation of all the primitive polynomials for GF(8) to GF(256).

TABLE 3

Primitive Polynomials for Various Galois Fields

| GF(x) | p(x) | GF(x) | p(x) | GF(x) | p(x) |
| --- | --- | --- | --- | --- | --- |
| 8 | 11 | 128 | 137 | 256 | 285 |
| 16 | 19 | 128 | 143 | 256 | 361 |
| 32 | 37 | 128 | 157 | 256 | 487 |
| 32 | 61 | 128 | 247 | 256 | 299 |
| 32 | 55 | 128 | 191 | 256 | 357 |
| 64 | 67 | 128 | 213 | 256 | 355 |
| 64 | 103 | 128 | 131 | 256 | 351 |
| 64 | 109 | 128 | 203 | 256 | 451 |
| | | 128 | 229 | | |

As can be seen from the above table, there is only one primitive polynomial for GF(8) and GF(16), due to the smallness of the field, however, GF(128) has 9 primitive polynomials and GF(256) has 8 primitive polynomials. As mentioned previously, each of these integer representations has a corresponding polynomial representation. For example, one primitive polynomial, p(x) for GF(256) is 285, which corresponds to $p(x)=x^8+x^4+x^3+x^2+1$.

Multiplication in finite fields is easily computed using the polynomial format. For the following examples, GF(8) and $p(x)=x^3+x+1$ are used to build the multiplication tables in Tables 4 and 5. The primitive polynomial is used to reduce or 'fold' the product or summation results back into the field. For example:

$$x^2 \times x^2 = x^4$$

where $x^4$ is not a member of the GF(8) field. The primitive polynomial, p(x), is then used in a polynomial division to generate the remainder of:

$$x^4/p(x)=x^4/x^3+x+1=x^2+x$$

The same primitive polynomial is used to generate the entire multiplication table per GF, even if more than one primitive polynomial exists for a particular GF.

TABLE 4

GF(8), p(x) = $x^3 + x + 1$, Multiplication Example Part 1.

| X | 0 | 1 | x | x + 1 | $x^2$ | $x^2$ + 1 | $x^2$ + x | $x^2$ + x + 1 |
|---|---|---|---|---|---|---|---|---|
| 0 | 0 | 0 | 0 | 0 | 0 | 0 | 0 | 0 |
| 1 | 0 | 1 | x | x + 1 | $x^2$ | $x^2$ + 1 | $x^2$ + x | $x^2$ + x + 1 |
| x | 0 | x | $x^2$ | $x^2$ + x | x + 1 | 1 | $x^2$ + x + 1 | $x^2$ + 1 |
| x + 1 | 0 | x + 1 | $x^2$ + x | $x^2$ + 1 | $x^2$ + x+ 1 | $x^2$ | 1 | x |
| $x^2$ | 0 | $x^2$ | x + 1 | $x^2$ + x + 1 | $x^2$ + x | x | $x^2$ | 1 |
| $x^2$ + 1 | 0 | $x^2$ + 1 | 1 | $x^2$ | x | $x^2$ + x + 1 | $x^2$ + 1 | $x^2$ + x |
| $x^2$ + x | 0 | $x^2$ + x | $x^2$ + x + 1 | 1 | $x^2$ + 1 | x + 1 | x | $x^2$ |
| $x^2$ + x + 1 | 0 | $x^2$ + x + 1 | $x^2$ + 1 | x | 1 | $x^2$ + x | $x^2$ | x + 1 |

Galois Field (GF) multiplication is an important and necessary function, i.e. performed many times, in Reed-Solomon (RS) codes. RS codes are used in many communication applications such as satellites, modems, audio compact disks, and set-top boxes as a digital data transmission forward error correction tool. Each one of these applications has a different standard. Each standard defines a symbol size, a GF, and a primitive polynomial. Each application requires a unique GF multiplier or a GF multiplier which has a unique configuration to be created which will at least depend on the symbol size, the size of the Galois Field and the primitive polynomial used. There has never been a GF multiplier which could implement all the different standards in a cost efficient manner.

SUMMARY OF THE INVENTION

An implementation of a multi-dimensional Galois Field multiplier for Galois Fields from a GF(8) up to a GF(256) is disclosed. This GF multiplier is able to support many different communication standards such as standards with different symbol sizes, different GFs, and different primitive polynomials. The key to allow a single implementation of a GF multiplier to perform for all different GF sizes is to shift input operand B and primitive polynomial PP signals to the left and to shift the output ZO to the right, depending upon the size of the GF, as will be further described in the following paragraphs and shown in FIGS. 1, 3 and 6. The shifting of signals allows the MULT_XOR arrays to operate on all fields with the exact same hardware with a minimum delay of just two XOR gates per block. In other words, the critical path of each MULT_XOR block is just 2 XOR gates. The solution presented is a cost efficient multiplier configuration.

BRIEF DESCRIPTION OF THE DRAWINGS

FIG. 3 shows a block diagram of the shift up block of the primitive polynomial, p(x).

FIG. 5 shows the schematic diagram of the MULT_XOR array of FIG. 4 according to a preferred embodiment of the invention.

FIG. 6 shows the block diagram of the shift down block according to a preferred embodiment of the invention.

FIG. 7 shows the schematic diagram of a modified version of the MULT-XOR array shown in FIG. 5.

DETAILED DESCRIPTION OF THE PREFERRED EMBODIMENTS

Figure 1:
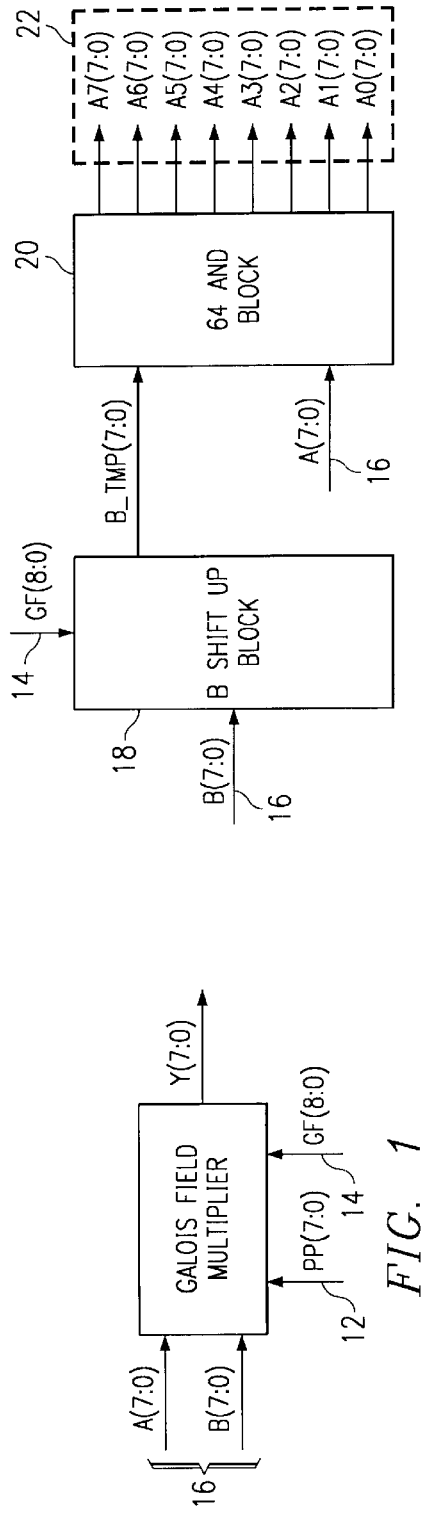
FIG. 1 shows the top-level block diagram of a Galois Field Multiplier according to a preferred embodiment of the invention.

A Galois Field multiplier is disclosed which works for all 25 primitive polynomials listed in Table 3 and for all GFs between 8 and 256. Therefore, an implementation of the GF multiplier must be able to compute the GF multiplication with any p(x)(for a particular GF), labeled as PP(12), and particular GF(14) as inputs as well as the A and B operands (16), which will be elements within the particular GF. The top-level block is shown in FIG. 1. GF(8) equals a binary 000001000 and GF(256) equals binary 100000000. The lower order bits (2:0) are a constant and are not needed in the circuit but are shown for clarity purposes.

Figure 4:
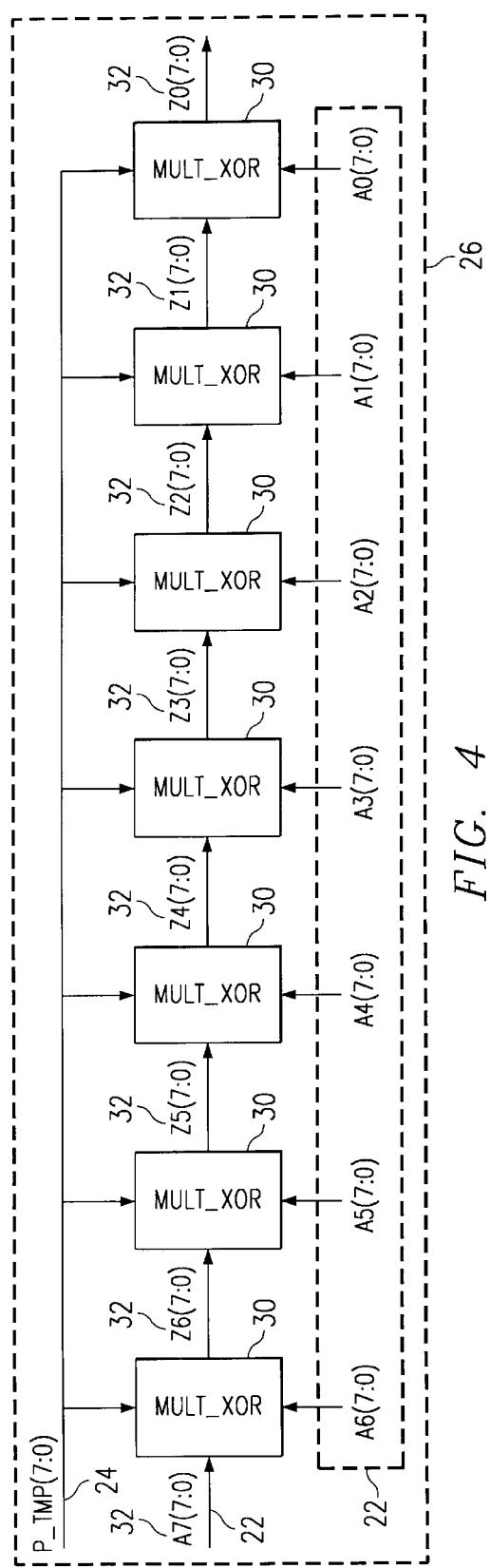
FIG. 4 shows the block diagram of the MULT XOR array according to a preferred embodiment of the invention.
Figure 2:
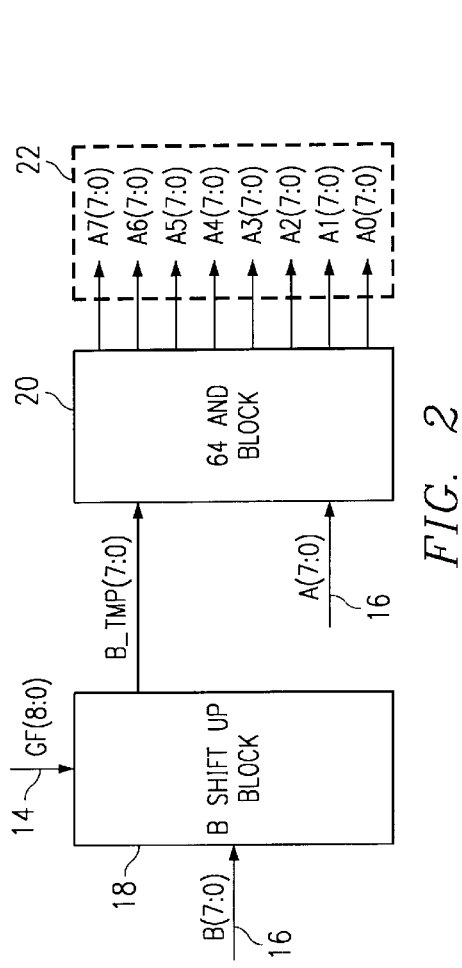
FIG. 2 shows a block diagram of the shift up block and 64 AND block according to a preferred embodiment of the invention.

FIG. 2 shows a block diagram of the B "shift up block" (18) and the 64 AND gate block(20). The B shift up block(18) shifts the B operand(16), in this exemplary example, to the left a certain number of positions, depending on the relative size of the GF, and then the least significant bits are set to zero. For GF(256), no shifting is required because each operand, A and B(16), is 8 bits and with 8 bits coming out, no shift is necessary. For GF(128), which corresponds to 7 bit operands(16), B(6:0) is shifted one bit to the left and B_TMP(0) is set to zero because you are inputting 7 bits and getting 8 bits out. For GF(64), corresponding to 6 bit operands(16), B(5:0) is shifted two bits to the left and B_TMP(1:0)(bit positions 0 and 1) are set to zeros. This pattern of up shifting is performed for all the other fields in the same manner. There are also major advantages to performing the shifting operation at the operand level, at the primitive polynomial level and finally at the output of the MULT-XOR block, versus the alternative of performing the shifting operations at each and every MULT-XOR block as shown in FIG. 4. By performing the shifting operations at the former points within the multiplier, a smaller and less complex multiplier results due to the fewer shifts that will have to be performed.

FIG. 2 also shows the block diagram of the 64 AND block(20). This block(20) contains 64 AND gates. Every possible combination of A(7:0) and $B_{13}$ TMP(7:0) are ANDed together. A7(7:0) is the output of ANDing A(7) with all 8 signals of B_TMP(7:0). A6(7:0) is the output of the ANDing of A(6) with all 8 signals of B_TMP(7:0). This pattern of ANDing continues for A(5), A(4), A(3), A(2), A(1) and A(0), yielding A0–A7(7:0)(22) outputs which become inputs in a later step as shown in FIG. 4.

Independently, a shift up operation is being performed on the primitive polynomial PP(7:0)(12) as shown in FIG. 3. The primitive polynomial(12) is shifted up a certain number of positions in dependence upon the number of bits the primitive polynomial comprises as compared to the number of bits within the GF as disclosed and explained in the B operand shift up block shown in FIG. 2. This block function is identical to the B shift up block shown in FIG. 2 and yields P_TMP(7:0)(24) which like A0–A7(7:0)(22), become inputs to a later step shown in FIG. 4. This block is also implemented with multiplexors.

FIG. 4 shows the MULT_XOR array(26). According to the example of using a GF(128), the array consists of seven MULT_XOR blocks(30) having P_TMP(24) and A0–A7 (7:0)(22) as inputs and Z0–Z6(7:0)(28) as outputs. The logical components and configuration of a single MULT_XOR block(30) are shown in FIG. 5. As shown in FIG. 5, the inputs to the MULT_XOR block(30) are the P_TMP(24), A0–A7(7:0)(22) and ZI(32) signals. For each MULT_XOR block(30), the P_TMP(24) input signals will be the result of the shiftup block of the primitive polynomial(12) as shown in FIG. 3, the A input signal(22) will be one of the following: A6, A5, A4, A3, A2, A1 or A0, and the ZI(32) input signal will be one of the following: A7, Z6, Z5, Z4, Z3, Z2, Z1 or Z0. The output of each MULT_XOR block(30) is output signal ZO(28) and output ZO(28) will be one of the following: Z6, Z5, Z4, Z3, Z2, Z1, Z0. Of course, the exact inputs and output signal will depend on which MULT_XOR block(30) within the framework of FIG. 4, is being operated upon.

The MULT_XOR block(30) performs several functions. Each block has two rows of XOR gates(34). These gates(34) are performing a GF(2) addition on each bit. This addition provides an implicit one bit shift to the left in each block due to the shifting corresponding to the cyclic nature of the finite field. When the most significant bit (MSB) of the previous block is high i.e. Z6_7, the current block must be ready to execute a polynomial division with the primitive polynomial (P_TMP(7:0))(24). The MSB of the previous block is ANDed with the primitive polynomial(P_TMP(7:0))(24) and this intermediate result is XORed to the result Z0 as shown in FIG. 5. These functions are repeated 7 times, corresponding to 7 blocks, as shown in FIG. 4.

For GF(256) multiplications, 7 MULT_XOR blocks(30) are required. For GF(128) multiplications, only 6 MULT_XOR blocks(30) are required. For GF(64) multiplications, only 5 MULT_XOR blocks(30) are required. This pattern is repeated for all the smaller Galois Fields. The key to allow a single implementation to perform for all different GF sizes is to shift input operand B(or operand A)(16) and primitive polynomial PP(12) signals to the left and to shift the intermediate output ZO(28) to the right, all in dependence upon the size of the GF, as described in the above and following paragraphs and as shown in FIGS. 1, 3 and 6. The shifting of the above-identified signals allows the design to contain 7 identical MULT_XOR arrays. In addition, this design can operate on all fields with the exact same hardware with a minimum delay of just two XOR gates per block. In other words, the critical path of each MULT_XOR block is just 2 XOR gates.

FIG. 6 shows the block diagram of the ZO shift down block(36)or shift to the right block. The ZO shift down block(36) shifts the ZO operand(28) to the right depending upon the relative size of the GF(12), and then sets the most significant bits to zeros. For GF(256), as described in reference to FIG. 1 and the B operand, no shifting is required. For GF(128), ZO(7:1) is shifted one bit to the right and Y(7)(38) is set to zero, where Y(38) is the output of the shift down block(36). For GF(64), ZO(7:2) is shifted two bits to the right and Y(7:6) are set to zeros. This pattern of down shifting is performed for all the other fields in this manner.

The blocks described in FIGS. 1–6 were modeled in VHDL. The VHDL models were simulated with all possible combinations of A, B, GF, and p(x); and the results were verified against a C model. There are 687,424 possible combinations.

The VHDL models were synthesized using Texas Instruments' TSC5000ULV ASIC library. The synthesis results for the MULT_XOR block(30) are shown in FIG. 5. The MULT_XOR block(30) requires 43.75 gates and has a worst case delay of 0.60 ns. Synthesizing the rest of the design, keeping the MULT_XOR array structure as shown in FIG. 4, resulted in a design with 563.75 gates. This design had a worst case delay of 6.83 ns from the A and B inputs to the Y output. The delay from GF or PP to the Y output is slightly larger but is not significant in view of in all applications, the GF and PP will remain constant for a specific RS encode or decode.

A second preferred embodiment entails 'flattening' the blocks. 'Flattening' a block is a way of combining all the smaller functional blocks into one large block and removing any redundant functions or replacing multiple functions with one larger more efficient function which could have a smaller area and/or smaller circuit delay. This implementation resulted in a design which required 655.50 gates and had a worst case delay of 5.34 ns.

The implementation according to a first and second embodiment of the invention as described in the above paragraphs is for Galois Fields 8, 16, 32, 64, 128, and 256. Additional GFs which have a power of two could be added. Also, several GFs could be removed to save area and/or reduce the circuit's critical delay. For example, GF(256) requires 8 bit operands and 7 MULT-XOR blocks(30). GF(128) requires 7 bit operands and 6 MULT-XOR blocks. Therefore, if one wants a design which does not operate on GF(256) operands, then one bit could be removed from all buses and one MULT-XOR block(30) could be deleted from the design. As another example, there are 25 primitive polynomials listed in Table 3. The block shown in FIG. 5 has AND functions for all 8 bits. Because all bits have these AND gates, all primitive polynomials with degrees 8 or less could be executed with this circuit. In addition, if an application wanted to reduce the number of primitive polynomials that the circuit could handle, any unused AND gates could be omitted. For example, as shown in FIG. 7, for GF(256), $p(x)=x^8+x^4+x^3+x^2+1$. Therefore, all AND gates with a zero can be removed. Also, the zeros applied to the XOR gates can also be removed. This design will be smaller by 10 gates. Again this could save area and/or reduce critical paths.

What is claimed is:

1. A Galois field multiplier, for multiplying first and second operands within a selected Galois field, comprising:

a first shiftup circuit for shifting said first operand to a left most bit aligned bit position and presenting the shifted first operand at an output;

first AND gate circuitry for ANDing, in a bit-by-bit manner, the second operand with the shifted first operand at the output of said first shiftup circuit, to produce a plurality of intermediate outputs arranged in a sequence;

a second shiftup circuit for shifting up a primitive value, corresponding to a primitive polynomial of the selected Galois field, to a left most bit aligned bit position and presenting the shifted primitive value at an output;

a plurality of exclusive OR circuits, arranged in a sequence, receiving the plurality of intermediate outputs and the shifted primitive value, wherein a first exclusive OR circuit combines a first two most significant ones of the intermediate outputs, according to the shifted primitive value, to produce a partial sum, wherein each of the others of the plurality of exclusive OR circuits in the sequence combines a partial sum from a previous one of the plurality of exclusive OR circuits in the sequence with a corresponding one of the intermediate outputs, according to the shifted primitive value, to produce a partial sum, and wherein the last of the plurality of exclusive OR circuits in the sequence produces a final partial sum; and a shift down circuit for shifting down the final partial sum to a right most bit aligned bit position, to produce a Galois field product of the first and second operands.

2. The multiplier of claim 1, wherein said first shiftup circuit comprises:

a register for shifting said first operand to a most significant position of said register, adding zeros following the shifted first operand to fill said register, wherein said register has a number of bit positions corresponding to the size of the selected Galois field.

3. The multiplier of claim 2, further comprising multiplexors for performing the shifting and adding of zeros operations.

4. The multiplier of claim 1, wherein said shift down circuit comprises:

a register for shifting said final partial sum to a least significant position of said register, adding zeros above the shifted final partial sum to fill said register, wherein said register has a number of bit positions corresponding to the size of the selected Galois field.

5. The multiplier of claim 4, further comprising multiplexors for performing the shifting and adding of zeros operations.

6. A method of Galois field multiplication comprising the steps of:

shifting up a first operand in a selected Galois field to a left most bit aligned bit position;

operating AND gate circuitry to perform a bit-by-bit AND between a second operand and the shifted first operand, to produce a plurality of intermediate results;

shifting up a digital primitive value, corresponding to a primitive polynomial associated with the selected Galois field, to a left most bit aligned bit position;

applying first and second most significant ones of the intermediate results to a first exclusive ORing logic gate circuit, in combination with said primitive value, to produce a first partial sum;

operating each one of a sequence of exclusive ORing logic gate circuits to combine a partial sum from a previous exclusive ORing logic gate circuit with a corresponding one of the plurality of intermediate results, in combination with said primitive value, to produce a partial sum; and shifting down a partial sum from a last one of the sequence of exclusive ORing logic gate circuits to a right most bit aligned bit position to produce a Galois field product of the first and second operands.

7. The method of Galois field multiplication according to claim 6, wherein the shifting up step comprises:

shifting said first operand to a most significant position within a register by a number of bit positions corresponding to a comparison of the number of elements in said Galois field and the size of the first operand, and adding zeros following the shifted first operand to fill said register, wherein said register has a number of bit positions corresponding to the size of the selected Galois field.

8. The method of Galois field multiplication according to claim 7, and further comprising the step of multiplexing said first operand for performing the shifting and adding of zeros operations.

9. The method of Galois field multiplication according to claim 6, wherein the shifting down step comprises:

shifting said partial sum to a least significant position within a register by a number of bit positions corresponding to a comparison of the number of elements in said Galois field and the size of the partial sum, and adding zeros above the shifted partial sum to fill said register, wherein said register has a number of bit positions corresponding to the size of the selected Galois field.

10. The method of Galois field multiplication according to claim 9, and further comprising the step of multiplexing said partial sum for performing the shifting and adding of zeros operations.

11. A method of operating a single multiplication circuit to perform a multi-dimensional Galois field multiplication of first and second operands within a selected one of a plurality of Galois fields of different sizes, comprising the steps of:

shifting the first operand and a primitive value derived from a primitive polynomial corresponding to the selected Galois field, by a number of bit positions corresponding to a comparison of the size of the first operand and the primitive value, respectively, relative to the size of the selected Galois field, to a left most bit aligned bit position;

performing a bit-by-bit ANDing of said second operand and said shifted first operand to produce a plurality of product outputs;

performing a sequence of exclusive OR operations of said plurality of product outputs and said shifted primitive value to yield an intermediate output; and shifting said intermediate output by a number of bit positions corresponding to a comparison of the size of the intermediate output and the size of the selected Galois field, to a right most bit aligned bit position.

* * * * *